Patented Aug. 3, 1926.

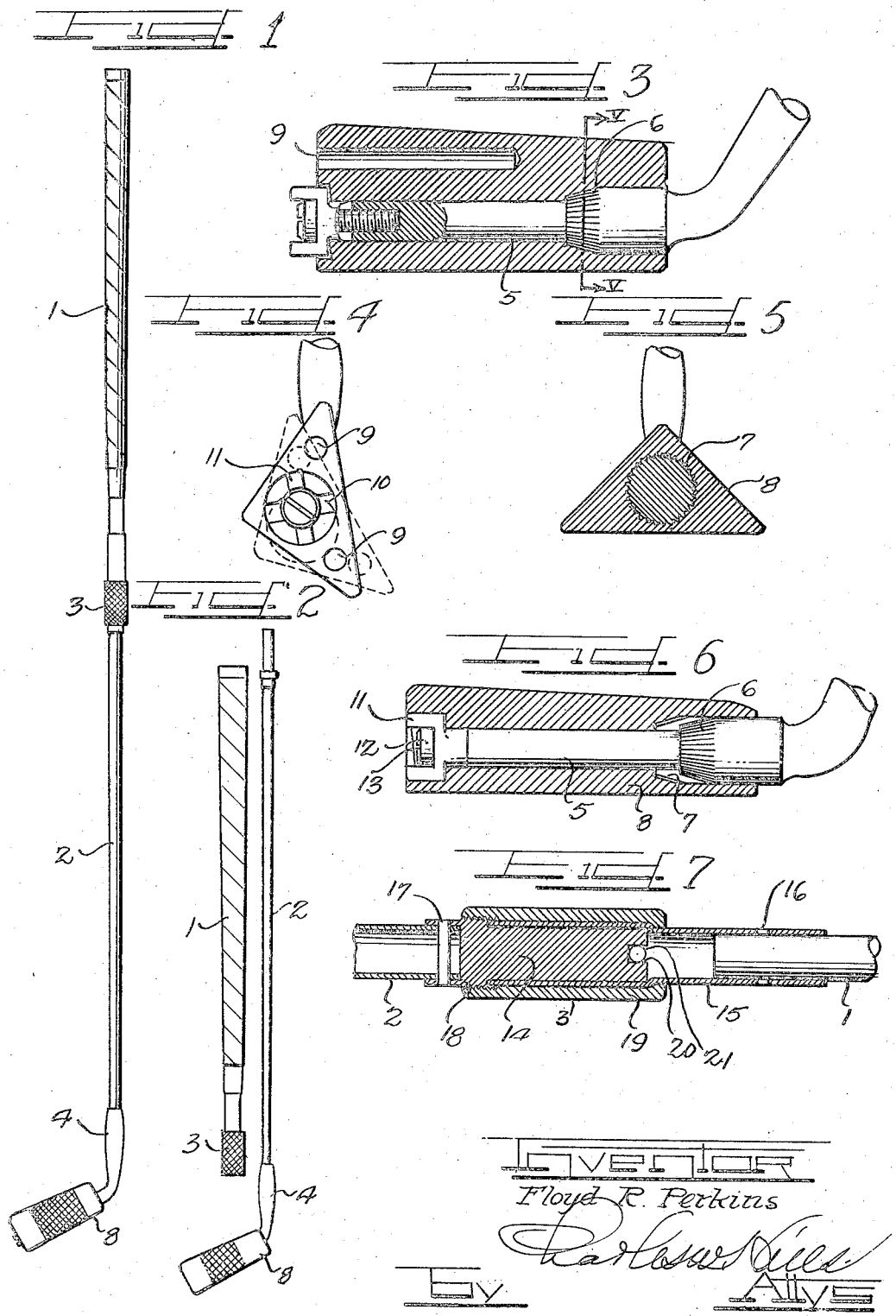

1,594,850

UNITED STATES PATENT OFFICE.

FLOYD R. PERKINS, OF CHICAGO, ILLINOIS.

GOLF CLUB.

Application filed March 23, 1925. Serial No. 17,469.

This invention relates to golf clubs, more particularly to those of the type in which the angular position of the head is adjustable relatively to the shaft.

One of the principal objects of the invention is to provide an improved form of adjustable head.

Another object of the invention is to provide a club having a shaft constructed in sections and an improved joint for said sections.

With the above and other objects in view, as will be apparent, this invention consists in the construction, combination and arrangement of parts, all as hereinafter more fully described, claimed and illustrated in the accompanying drawings.

On the drawings:

Figure 1 shows an elevational view of a club embodying this invention.

Figure 2 shows the club of Figure 1 disjointed.

Figure 3 is a detail longitudinal section of the head.

Figure 4 represents a detail end view of the head.

Figure 5 represents a section along the line 5—5 of Figure 3.

Figure 6 is a detail longitudinal section of the head.

Figure 7 is a detail longitudinal section of the joint.

As shown on the drawings:

The shaft comprises an upper section 1 and a lower section 2 secured together by means of the joint 3. Suitably secured to the lower end of the lower section 2 is a ferrule 4 which has integral therewith a spindle 5. The spindle 5 has a serrated enlarged portion 6 thereon which as shown more particularly in Figure 5 is adapted to engage with the serrations 7 of a head 8 surrounding said spindle. The head 8 is adapted to be a rotatably adjusted about the spindle 5 as shown in Figure 4 to present any desired angle or slope of said head to the golf ball. The head 8 for this reason is of a triangular cross-section, such section being that of an isosceles triangle. The head 8 may be apertured longitudinally by apertures 9 any suitable amount to provide a balancing of said head. As shown in Figure 6 and at 10 in Figure 4 the head 8 is slotted to permit a wing nut 11 to slide therein. The wing nut 11 is secured to the end of the spindle 5 by means of a screw 12 and is rotatable on said spindle 5. The head 8 is recessed at the outer portion of the slot 10, the diameter of said recess being that of the ring nut 11. The base 13 of said recess is slanting. When the wing nut 11 is slid into the slot 10, the serrated portion 6 of the spindle 5 is adapted to move rearwardly of the serrated portion 7 of the head as shown in Figure 6. In this position the head 8 may be moved to any angular position about the spindle 5, for instance to the dotted line position shown in Figure 4. When the desired position is obtained, the head 8 may be moved rearwardly on the spindle 5 to the position shown in Figure 3 for causing the serrated portion 6 to engage with the serrated portion 7 of the head. The ring nut 11 may then be rotated so as to engage with the slanting base 13 of the recess on the end of the head, causing said head and serrations 7 thereon to firmly engage with the serrations 6 of said spindle. As shown in Figure 7 the joint 3 comprises a cylindrical member 14 which is adapted to slidably receive thereover a ferrule 15. The ferrule 15 has a narrow portion which is adapted to closely fit over the end of the handle portion 1 and which is pinned to said handle portion by means of a pin 16. The cylindrical member 14 is recessed at one end thereof to receive the end of the section 2 therein, said section being secured to said cylindrical member 14 by means of a pin 17. The cylindrical member 14 has integral therewith a series of threads 18 which are adapted to be engaged by a thimble 19 rotatably secured on the ferrule 15. The cylindrical member 14 is slotted at one end thereof as at 20 for engagement with a pin 21 extending through the ferrule 15 for preventing relative rotation between said cylindrical member 14 and said ferrule 15. It will be seen that all that is necessary to disjoint the two sections 1 and 2 is to unthread the thimble 19 from the threads 18 of the cylindrical member 14. It will also be apparent that a very simple means is provided for adjustably mounting a head 8 on the spindle 5.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. An adjustable golf club comprising a shaft, a pivot member thereon, a head having a longitudinal cylindrical passage adapted to receive said pivot member, locking means on said member adapted to slidably engage locking means on the interior of said passage, said head having a slot adjacent the end of said passage, said head having a recess adjacent the outer end of said slot, the bottom of said recess being sloped, a rotatable member mounted on said pivot member and adapted upon the rotation thereof to engage with the bottom of said recess for causing the engagement of said locking means, said slot being adapted when said rotatable member is in a selected position for receiving the same for permitting said locking means to disengage.

2. An adjustable golf club comprising a shaft, a pivot member thereon, a head having a longitudinal cylindrical passage adapted to receive said pivot member, locking means on said member adapted to slidably engage locking means on the interior of said passage, said head having a slot adjacent the end of said passage, a rotatable member mounted on said pivot member and secured against axial movement relative thereto, and adapted when in a selected position to enter said slot for permitting said locking means to disengage.

3. A joint for the detachable sections of a golf club comprising a cylindrical member permanently secured to one of said sections, a ferrule permanently secured to another of said sections, said ferrule being adapted to slide over said cylindrical member, means in said ferrule for engaging the end of said cylindrical member for preventing relative rotational movement therewith, and a thimble rotatably mounted on said ferrule and adapted to threadedly engage said cylindrical member for rigidly holding the same in said ferrule.

4. A joint for the detachable sections of a golf club comprising a cylindrical member permanently secured to one of said sections, a hollow cylindrical member permanently secured to one of said sections, said hollow cylindrical member being adapted to slide over said cylindrical member, and a thimble rotatably mounted on said hollow cylindrical member and adapted to threadedly engage said first cylindrical member for rigidly holding the same in said hollow cylindrical member.

5. An adjustable golf club comprising a shaft, a pivot member thereon, a head having a longitudinal cylindrical passage adapted to receive said pivot member, locking means on said member adapted to slidably engage locking means on the interior of said passage, said head having a recess adjacent the end of said passage, said recess being of a greater diameter than the diameter of the passage, said head having a slot in said recess, the bottom of said recess being sloping, a rotatable member mounted on said pivot member in said recess and adapted to engage the bottom of said recess when rotated, said member being secured against axial movement relative to said pivot member and adapted, when rotated, for causing said locking means to engage, said pivot member being also adapted, when in a selected, rotated position to enter said slot for permitting said locking means to disengage.

In testimony whereof I have hereunto subscribed my name.

FLOYD R. PERKINS.